US007783806B2

United States Patent
Nir-Buchbinder et al.

(10) Patent No.: US 7,783,806 B2
(45) Date of Patent: Aug. 24, 2010

(54) DEADLOCK PREVENTION IN A COMPUTING ENVIRONMENT

(75) Inventors: Yarden Nir-Buchbinder, Haifa (IL); Rachel Tzoref, Haifa (IL); Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/049,399

(22) Filed: Mar. 17, 2008

(65) Prior Publication Data

US 2009/0235002 A1 Sep. 17, 2009

(51) Int. Cl.
*G06F 12/00* (2006.01)

(52) U.S. Cl. .................... 710/200; 707/8; 718/104
(58) Field of Classification Search ............... 710/200; 707/8–10; 718/104; 714/38
See application file for complete search history.

(56) References Cited

U.S. PATENT DOCUMENTS

| 7,673,181 | B1 * | 3/2010 | Lindo et al. | 714/38 |
| 2004/0221079 | A1 * | 11/2004 | Goldick | 710/200 |
| 2008/0184252 | A1 * | 7/2008 | Leeman | 718/104 |
| 2008/0243865 | A1 * | 10/2008 | Hu et al. | 707/10 |

OTHER PUBLICATIONS

H. Jula and G. Candea. "A scalable, sound, eventually-complete algorithm for deadlock immunity", Technical Report EPFL-DSLAB-2007-002, EPFL, Lausanne, Switzerland, 2007. http://dslab.epfl.ch/pubs/dimmunix-algo.

* cited by examiner

*Primary Examiner*—Clifford H Knoll

(57) ABSTRACT

A method for preventing deadlocks in a multiprocessing environment is provided. The method comprises receiving one or more strongly connected components (SCCs) as input, wherein a first SCC represents a set of locks such that each pair of locks in the set may potentially be involved in a deadlock situation; creating a first gate lock for the first SCC, wherein a first process or process element acquires the first gate lock before acquiring a first lock in the first SCC and releases the first gate lock after releasing a number of locks in the first SCC; and removing the first gate lock, in response to determining that the first gate lock introduces new deadlocks.

20 Claims, 6 Drawing Sheets

DEADLOCK PREVENTION IN A COMPUTING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to multiprocessing computing environments and, more particularly, to a healing mechanism for preventing deadlocks.

BACKGROUND

In a multiprocessing computing environment, more than one process may actively use the resources available in the computing environment. To avoid corruption of a resource due to the concurrent use or modification by multiple processes, a process may lock a resource during use and release the lock after the process has finished using the resource. A deadlock situation may occur when two processes or two elements (e.g., threads) in a process each wait for the other to release a lock on the same resource, thus suspending execution for an infinite period of time.

Deadlocks may be prevented by requiring processes and process elements to declare which resources they want to allocate in advance, so that a system may restrict allocation of resources to requests that do not lead to deadlocks. Yet, for many systems, it is difficult to know what resources a process or thread will request in advance.

Other solutions for preventing deadlocks involve using non-blocking synchronization or avoiding circular wait. Implementation of these solutions, however, is limited to synchronization algorithms that behave in ways that are often difficult to enforce on existing systems. Another possible solution is to use a transaction mechanism with the option to roll back transactions that lead to deadlocks, but roll back has high overhead costs.

Thus, methods and systems for preventing deadlocks are needed that are able to overcome the above-noted shortcomings.

SUMMARY

The present disclosure is directed to systems, methods and corresponding products that facilitate deadlock prevention in a multiprocessing environment.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for preventing deadlocks in a multiprocessing environment is provided. The method comprises receiving one or more strongly connected components (SCCs) as input, wherein a first SCC represents a set of locks such that each pair of locks in the set may potentially be involved in a deadlock situation; creating a first gate lock for the first SCC, wherein a first process or process element acquires the first gate lock before acquiring a first lock in the first SCC and releases the first gate lock after releasing a number of locks in the first SCC; and removing the first gate lock, in response to determining that the first gate lock introduces new deadlock.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate deadlock prevention in a multiprocessing environment.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

A locking scheme or discipline may be used to prevent deadlocks by defining the order in which one or more processes or threads may lock one or more shared resources.

Figure 1:
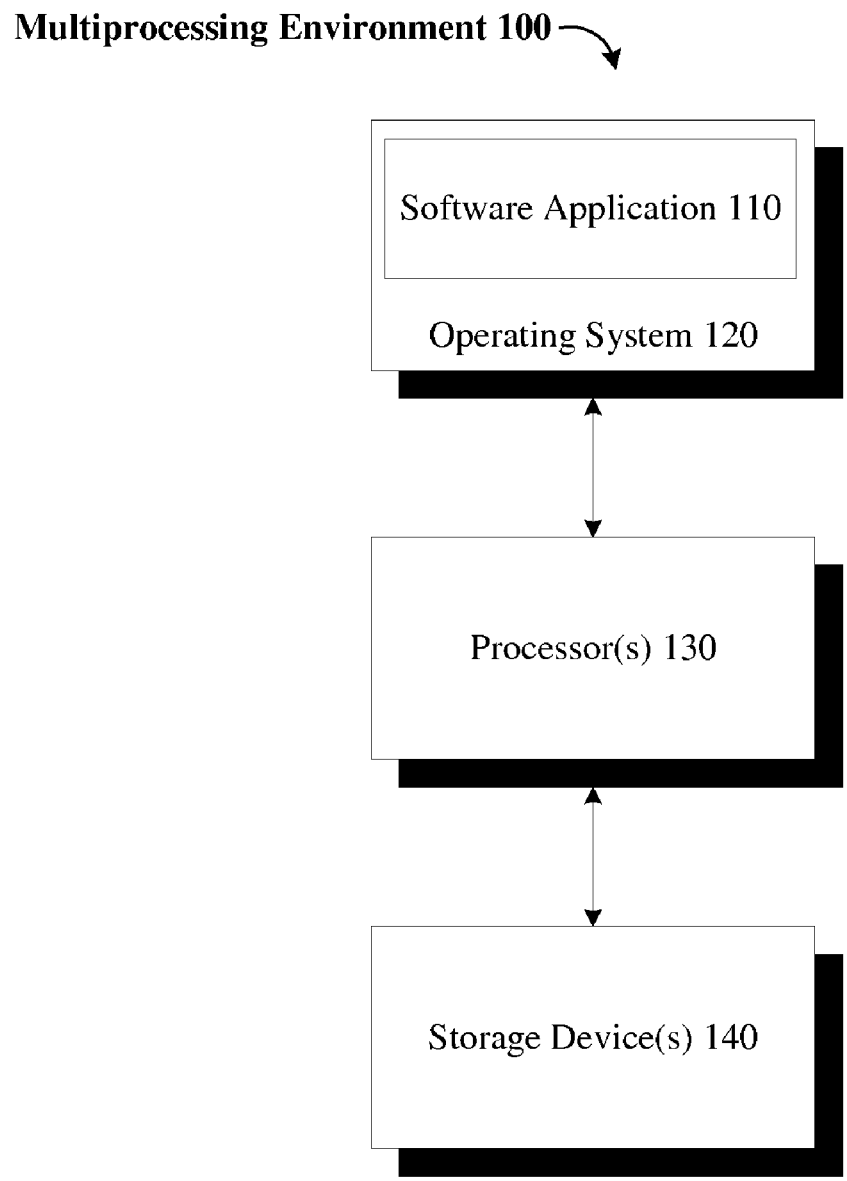
FIG. 1 illustrates an exemplary multiprocessing environment in accordance with one embodiment.

Referring to FIG. 1, in accordance with one embodiment, an exemplary multiprocessing environment 100 comprises a software application 110 that runs on top of an operating system 120. Software application 110 is configured to prevent, or heal, deadlocks in a program (not shown). Operating system 120 may receive requests from one or more processes or threads to allocate shared resources on one or more storage devices 140. The processes or threads may be executed by one or more processors 130, which may belong to one or more computing systems connected to storage devices 140 over a network (not shown).

In accordance with one embodiment, software application 110 may implement a lock discipline that orders or synchronizes locks by creating gate locks around strongly connected components (SCCs). An SCC represents a set of locks such that each pair of locks in the set may potentially be involved in a deadlock. A gate lock refers to a lock that synchronizes an SCC. Before acquiring a lock in an SCC, a process or thread first acquires a corresponding gate lock. The gate lock may not be released until all the locks in the SCC are released.

Figure 2:
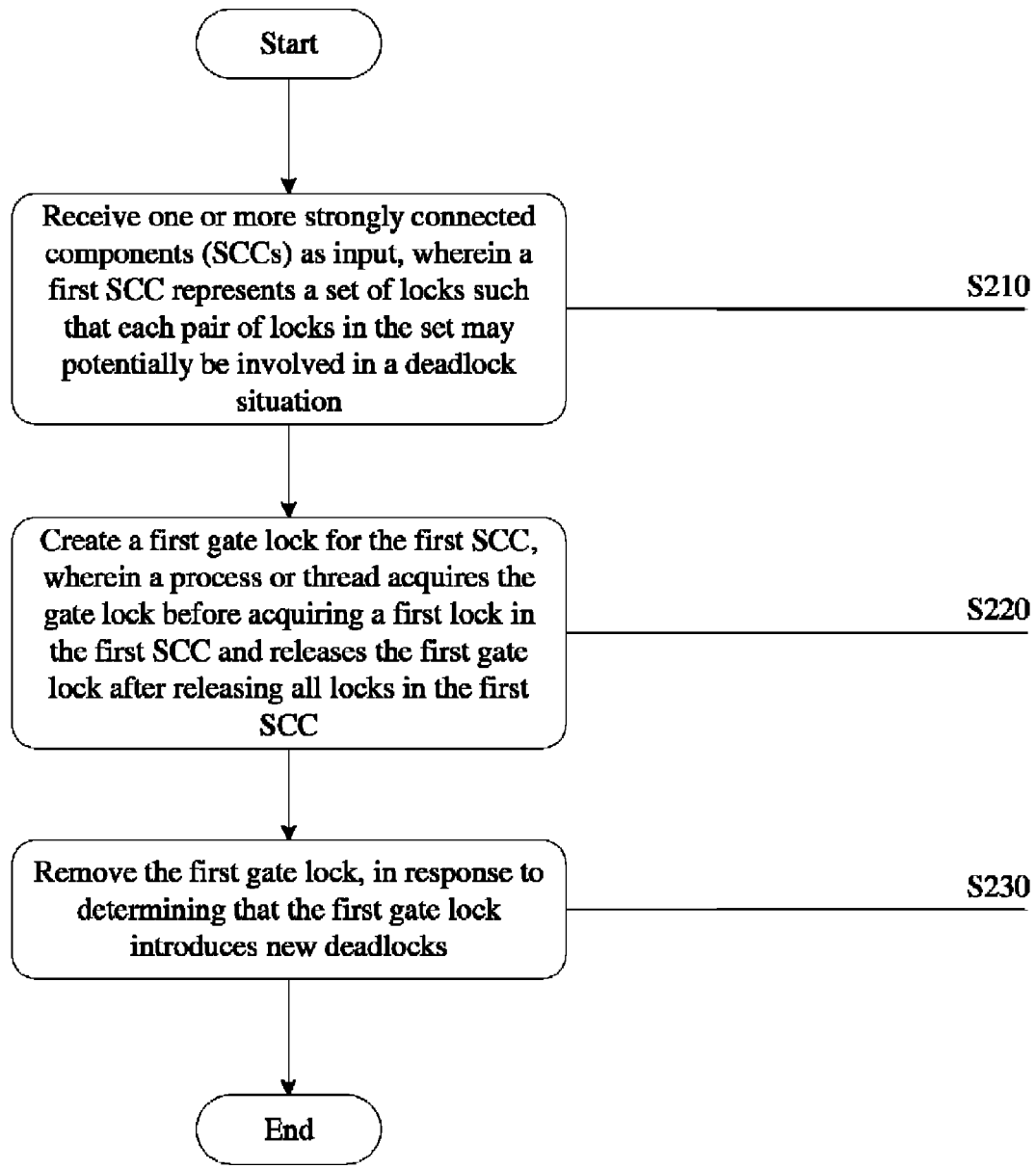
FIG. 2 is a flow diagram of an exemplary method for preventing deadlocks using gate locks, in accordance with one embodiment.

Referring to FIGS. 1 and 2, in accordance with one embodiment, software application 110 may receive one or more SCCs as input (S210). For each SCC, software application 110 may create a gate lock, wherein a process or thread acquires the gate lock before acquiring any lock in the SCC and releases the gate lock after releasing all locks in the SCC (S220).

TABLE 1

| Time | Thread T1 | Thread T2 |
| --- | --- | --- |
| | | Acquire lock AB | |
| | | Acquire lock A | |
| | | Acquire lock B | |
| | | Release lock B | |
| | | Release lock A | |
| | | Release lock AB | |
| | | | Acquire lock AB |
| ↓ | | Acquire lock B |
| | | Acquire lock A |
| | | Release lock A |
| | | Release lock B |
| | | Release lock AB |

Table 1, in accordance with one embodiment, illustrates a scenario in which locks A and B are in an SCC with a gate lock AB. During execution, thread T1 acquires gate lock AB, lock A then lock B, and thread T2 acquires gate lock AB, lock B, then lock A. As shown in Table 1, gate lock AB synchronizes access to the SCC so that T2 may not acquire any of the lock in the SCC until T1 releases all of the locks in the SCC, preventing deadlocks involving locks A and B which are in the SCC. Without gate lock AB, an ordering of events that causes a deadlock is possible in which T1 acquires lock A, T2 acquires lock B, then T2 waits for lock A and T1 waits for lock B.

Referring back to FIGS. 1 and 2, software application 110 may remove gate locks that introduce new deadlocks (S230). A gate lock may introduce new deadlocks if software application 110 receives incomplete SCCs as input. The input may be incomplete since it is based on lock acquiring patterns observed in previous runs rather than in all possible runs.

TABLE 2

| Time | Thread T1 | Thread T2 |
| --- | --- | --- |
| | | Acquire lock AB | Acquire lock C |
| | | Acquire lock A | [Acquire lock AB] |
| | | [Acquire lock C] | Acquire lock B |
| ↓ | [Release lock C] | [Release lock B] |
| | [Release lock A] | [Release lock AB] |
| | [Release lock AB] | [Release lock C] |

Table 2 illustrates a scenario in which software application 110 receives as input one SCC containing locks A and B. The input is incomplete because software application 110 is unable to detect from the input that lock C may potentially be involved in a deadlock with locks A or B. During execution, thread T1 acquires AB and A, while thread T2 acquires C. A deadlock occurs when T1 waits for T2 to release C while T2 waits for T1 to release AB. The deadlock may be prevented by removing gate lock AB since the deadlock does not occur if gate locks are disabled.

Figure 3:
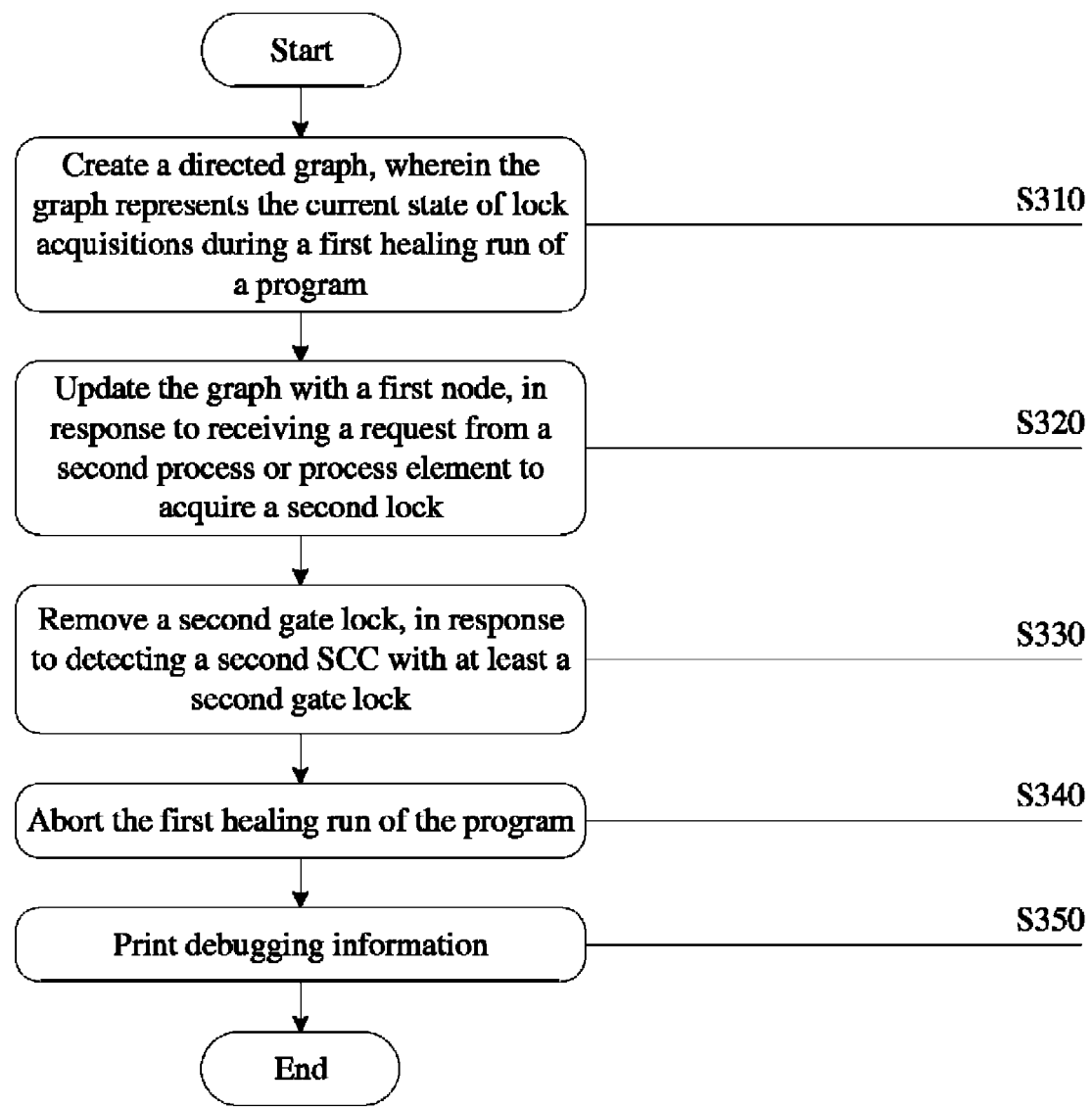
FIG. 3 is a flow diagram of an exemplary method for removing gate locks that create new deadlocks, in accordance with one embodiment.

Referring to FIGS. 1 and 3, in accordance with one embodiment, software application 110 may remove gate locks that introduce new deadlocks by creating a directed graph that represents the current state of lock acquisitions during healing of a program (S310).

Figure 4:
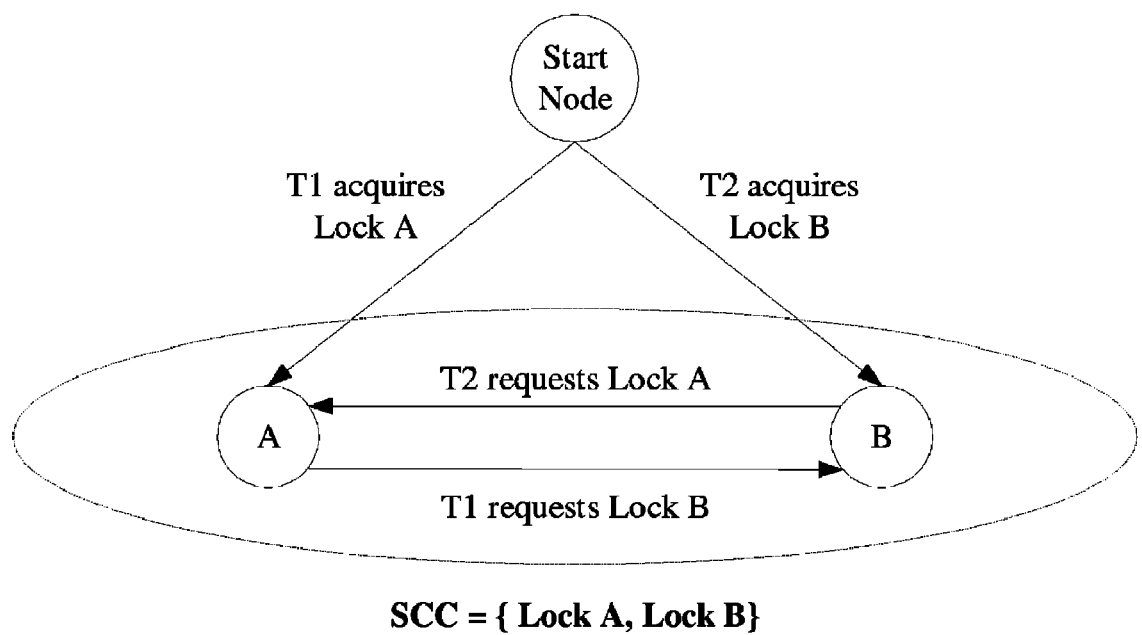
FIG. 4 illustrates an exemplary directed graph, in accordance with one embodiment.

As illustrated in FIG. 4, an exemplary graph may comprise nodes representing acquired locks or requests by a process or thread to acquire a lock (e.g., node A=lock A) and directed edges representing the order in which the locks are acquired or requested (e.g., node A→node B=acquire lock A, then acquire lock B). An SCC may be represented by a cycle in the graph (e.g., node A→node B→node A). Nodes and edges may be removed when acquired locks are released or when lock requests are canceled.

Referring back to FIGS. 1 and 3, in accordance with one embodiment, software application 110 may update the graph with a new node, in response to receiving a request from a process or thread to acquire a lock (S320). Once the graph is updated, software application 110 may remove gate locks corresponding to each detected SCC in the graph that has a gate lock (S330). As illustrated earlier in the Table 2 example, removing a gate lock may heal newly introduced deadlocks. Any acquired locks in the detected SCCs, however, are still represented in the graph.

In accordance with one embodiment, if the requested lock is a gate lock corresponding to a detected SCC, software application 110 may cancel the request to acquire the requested lock. For other gate locks, software application 110 may notify each process or thread that is waiting to acquire a gate lock to cancel waiting for the gate lock.

In certain embodiments, software application 110 may, for example, notify a program process or thread to cancel waiting for a gate lock by using operating system 120's interrupt mechanism. If the process or thread may be interrupted by other processes or threads of the program, the process or thread may assume that it is being interrupted by a process or thread of the program, even if the process or thread is being interrupted by software application 110. Thus, software 110's use of the interrupt mechanism may be undesirable since it may change the program's semantics.

Alternatively, gate locks may be implemented with semaphores so that interrupting a process or thread does not affect acquiring a gate lock and acquiring a gate lock does not affect the process or thread's interrupt state.

Referring back to FIGS. 1 and 3, upon removing a gate lock for a detected SCC, software application 110 desirably aborts healing the program (S340) and records debugging information (e.g., records the SCC for future healing runs of the program) (S350). Operations S350 and S360 may also be performed if software application 110 detects an SCC without a gate lock.

In an alternative embodiment, software application 110 may continue to try to heal the program. Continuing to heal the program may be complicated, however, since the SCC input provided to software application 110 was incomplete and it may be difficult to avoid introducing new deadlocks (the reason why gate locks are being removed in the first place).

In some situations, a process or thread that acquires a lock may decide to wait on the lock (e.g., until some logical condition is met). When a process or thread waits on a lock, the process or thread may temporarily release the lock and then re-acquire the lock once the process or thread finishes waiting. If gate locks are enabled and the original lock is in an SCC with a gate lock, the process or thread may also temporarily release the gate lock after releasing the original lock. After the process or thread finishes waiting, the process or thread may re-acquire the gate lock then the original lock.

Depending on implementation, however, there may be no way for software application 110 to instruct a process or thread to re-acquire a gate lock before re-acquiring an original lock (e.g., Java has no byte code event related to re-acquiring a lock). If the two operations are reversed and the process or thread re-acquires the original lock before re-acquiring the gate lock, a deadlock may occur.

To address the above-noted problem, in accordance with one embodiment, software application 110 may re-acquire the original lock after waiting, re-release the original lock, re-acquire the gate lock, then re-acquire the original lock. In accordance with another embodiment, software application 110 may skip re-acquiring the gate lock and risk a potential deadlock. It is noteworthy that, in this case, software application 110 may not entirely abort healing the program.

In different embodiments, the invention may be implemented either entirely in the form of hardware or entirely in the form of software, or a combination of both hardware and software elements. For example, multiprocessing environment 100 may comprise a controlled computing system environment that can be presented largely in terms of hardware components and software code executed to perform processes that achieve the results contemplated by the system of the present invention.

Figure 5:
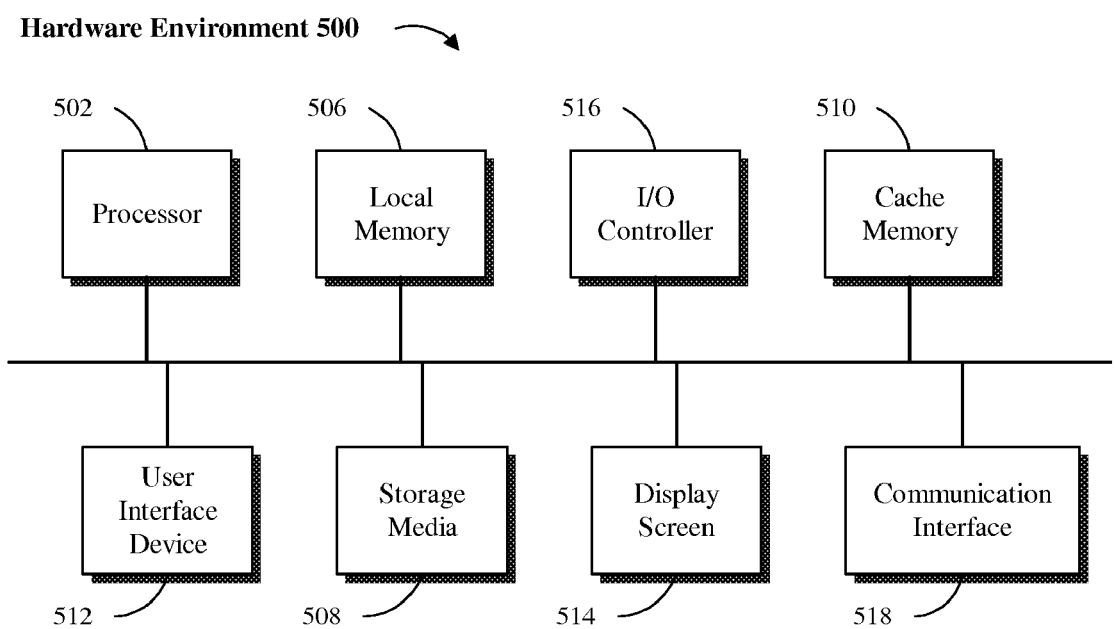
FIGS. 5 and 6 are block diagrams of hardware and software environments in which a system of the present invention may operate, in accordance with one or more embodiments.
Figure 6:
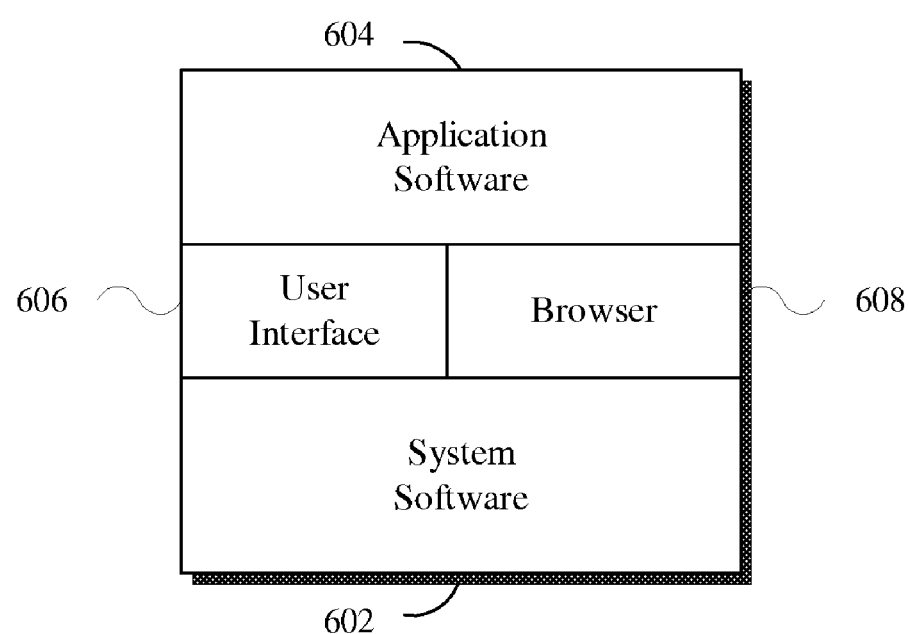

Referring to FIGS. 5 and 6, a computing system environment in accordance with an exemplary embodiment is composed of a hardware environment 500 and a software environment 600. The hardware environment 500 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 600 is divided into two major classes comprising system software 602 and application software 604. System software 602 comprises control programs, such as operating system 120 and information management systems that instruct the hardware how to function and process information.

In one embodiment, software application 110 may be implemented as system software 602 or application software 604 executed on one or more hardware environments to facilitate memory sharing among computing systems in a network. Application software 604 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that may contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 5, an embodiment of the system software 502 and application software 604 may be implemented as computer software in the form of computer readable code executed on a data processing system such as hardware environment 500 that comprises a processor 502 coupled to one or more computer readable media or memory elements by way of a system bus 504. The computer readable media or the memory elements, for example, may comprise local memory 506, storage media 508, and cache memory 510. Processor 502 loads executable code from storage media 508 to local memory 506. Cache memory 510 provides temporary storage to reduce the number of times code is loaded from storage media 508 for execution.

A user interface device 512 (e.g., keyboard, pointing device, etc.) and a display screen 514 can be coupled to the computing system either directly or through an intervening I/O controller 516, for example. A communication interface unit 518, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 500 may not include all the above components, or may comprise other components for additional functionality or utility. For example, hardware environment 500 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 518 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 6, system software 602 and application software 604 can comprise one or more computer programs that are executed on top of operating system 120 after being loaded from storage media 508 into local memory 506. In a client-server architecture, application software 604 may comprise client software and server software.

Software environment 600 may also comprise browser software 608 for accessing data available over local or remote computing networks. Further, software environment 600 may comprise a user interface 606 (e.g., a Graphical User Interface (GUI)) for receiving user commands and data. Please note that the hardware and software architectures and environments described above are for purposes of example, and one or more embodiments of the invention may be implemented over any type of system architecture or processing environment.

Also, the logic code, programs, modules, processes, methods and the order in which the respective operations of each method are performed are purely exemplary. Depending on implementation, the operations may be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for preventing deadlocks in a multiprocessing environment, the method comprising:
    receiving one or more strongly connected components (SCCs) as input, wherein a first SCC represents a set of locks such that each pair of locks in the set may potentially be involved in a deadlock situation;
    creating a first gate lock for the first SCC, wherein a first process or process element acquires the first gate lock before acquiring a first lock in the first SCC and releases the first gate lock after releasing a number of locks in the first SCC; and
    removing the first gate lock, in response to determining that the first gate lock introduces new deadlocks.

2. The method of claim 1, further comprising:
    creating a directed graph, wherein the graph represents the current state of lock acquisitions during a first healing run of a program;
    updating the graph with a first node, in response to receiving a request from a second process or process element to acquire a second lock;
    removing a second gate lock, in response to detecting a second SCC with at least the second gate lock in the directed graph;
    aborting the first healing run of the program, in response to detecting the second SCC; and
    recording debugging information, in response to detecting the second scc.

3. The method of claim 2, wherein removing the second gate lock comprises:
    canceling the request to acquire the second lock, in response to determining that the second lock is the second gate lock; and
    notifying a third process or process element to cancel waiting for the second gate lock, in response to determining that the second lock is in the second SCC.

4. The method of claim 3, wherein notifying the third process or process element comprises using an interrupt mechanism.

5. The method of claim 3, wherein notifying the third process or process element comprises implementing gate locks as semaphores.

6. The method of claim 1, further comprising:
    preventing deadlocks caused by a waiting operation,
    wherein a third lock is in a third SCC with a third gate lock,
    wherein the third lock is re-released after the waiting operation,
    wherein the third gate lock is re-acquired after the third lock is re-released,
    wherein the third lock is re-acquired after the third gate lock is re-acquired.

7. The method of claim 1, further comprising preventing deadlocks caused by a waiting operation, wherein a fourth lock is in a fourth SCC with a fourth lock and re-acquiring of the fourth gate lock is skipped.

8. A system comprising:
    a logic unit for receiving one or more strongly connected components (SCCs) as input, wherein a first SCC represents a set of locks such that each pair of locks in the set may potentially be involved in a deadlock situation;
    a logic unit for creating a first gate lock for the first SCC, wherein a first process or process element acquires the first gate lock before acquiring a first lock in the first SCC and releases the first gate lock after releasing a number of locks in the first SCC; and
    a logic unit for removing the first gate lock, in response to determining that the first gate lock introduces new deadlocks.

9. The system of claim 8, further comprising:
    a logic unit for creating a directed graph, wherein the graph represents the current state of lock acquisitions during a first healing run of a program;
    a logic unit for updating the graph with a first node, in response to receiving a request from a second process or process element to acquire a second lock;
    a logic unit for removing a second gate lock, in response to detecting a second SCC with at least the second gate lock in the directed graph;
    a logic unit for aborting the first healing run of the program, in response to detecting the second SCC; and
    a logic unit for recording debugging information, in response to detecting the second SCC.

10. The system of claim 9, wherein the logic unit for removing the second gate lock comprises:
    a logic unit for canceling the request to acquire the second lock, in response to determining that the second lock is the second gate lock; and
    a logic unit for notifying a third process or process element to cancel waiting for the second gate lock, in response to determining that the second lock is in the second SCC.

11. The system of claim 10, wherein the logic unit for notifying the third process or process element comprises a logic unit for using an interrupt mechanism.

12. The system of claim 10, wherein the logic unit for notifying the third process or process element comprises a logic unit for implementing gate locks as semaphores.

13. The system of claim 8, further comprising:
a logic unit for preventing deadlocks caused by a waiting operation,
wherein a third lock is in a third SCC with a third gate lock,
wherein the third lock is re-released after the waiting operation,
wherein the third gate lock is re-acquired after the third lock is re-released,
wherein the third lock is re-acquired after the third gate lock is re-acquired.

14. The system of claim 8, further comprising a logic unit for preventing deadlocks caused by a waiting operation, wherein a fourth lock is in a fourth SCC with a fourth lock and re-acquiring of the fourth gate lock is skipped.

15. A computer program product comprising a computer useable medium having a computer readable program, wherein the computer readable program when executed on a computer causes the computer to:
receive one or more strongly connected components (SCCs) as input, wherein a first SCC represents a set of locks such that each pair of locks in the set may potentially be involved in a deadlock situation;
create a first gate lock for the first SCC, wherein a first process or process element acquires the first gate lock before acquiring a first lock in the first SCC and releases the first gate lock after releasing a number of locks in the first SCC; and
remove the first gate lock, in response to determining that the first gate lock introduces new deadlocks.

16. The computer program product of claim 15, wherein the computer readable program when executed on a computer further causes the computer to:
create a directed graph, wherein the graph represents the current state of lock acquisitions during a first healing run of a program;
update the graph with a first node, in response to receiving a request from a second process or process element to acquire a second lock;
remove a second gate lock, in response to detecting a second SCC with at least the second gate lock in the directed graph;
abort the first healing run of the program, in response to detecting the second SCC; and
record debugging information, in response to detecting the second scc.

17. The computer program product of claim 16, wherein the computer readable program when executed on a computer causes the computer to:
cancel the request to acquire the second lock, in response to determining that the second lock is the second gate lock; and
notify, by using an interrupt mechanism, a third process or process element to cancel waiting for the second gate lock, in response to determining that the second lock is in the second SCC.

18. The computer program product of claim 16, wherein the computer readable program when executed on a computer causes the computer to:
cancel the request to acquire the second lock, in response to determining that the second lock is the second gate lock; and
notify, by implementing gate locks as semaphores, a third process or process element to cancel waiting for the second gate lock, in response to determining that the second lock is in the second SCC.

19. The computer program product of claim 15, wherein the computer readable program when executed on a computer further causes the computer to:
prevent deadlocks caused by a waiting operation,
wherein a third lock is in a third SCC with a third gate lock,
wherein the third lock is re-released after the waiting operation,
wherein the third gate lock is re-acquired after the third lock is re-released,
wherein the third lock is re-acquired after the third gate lock is re-acquired.

20. The computer program product of claim 15, wherein the computer readable program when executed on a computer further causes the computer to prevent deadlocks caused by a waiting operation, wherein a fourth lock is in a fourth SCC with a fourth lock and re-acquiring of the fourth gate lock is skipped.

* * * * *